(12) United States Patent
Benitez et al.

(10) Patent No.: US 8,682,821 B2
(45) Date of Patent: *Mar. 25, 2014

(54) METHOD FOR DETECTION OF MOVEMENT OF A SPECIFIC TYPE OF OBJECT OR ANIMAL BASED ON RADAR SIGNALS

(75) Inventors: Diego Benitez, Pittsburgh, PA (US); Zhaozhang Jin, Chicago, IL (US)

(73) Assignee: Robert Bosch GmbH, Stuttgart (DE)

( * ) Notice: Subject to any disclaimer, the term of this patent is extended or adjusted under 35 U.S.C. 154(b) by 260 days.

This patent is subject to a terminal disclaimer.

(21) Appl. No.: 13/204,974

(22) Filed: Aug. 8, 2011

(65) Prior Publication Data

US 2013/0041856 A1   Feb. 14, 2013

(51) Int. Cl.
*G06E 1/00* (2006.01)

(52) U.S. Cl.
USPC ............. 706/24; 342/192; 342/196; 342/28; 342/98

(58) Field of Classification Search
USPC .......................................................... 706/24
See application file for complete search history.

(56) References Cited

U.S. PATENT DOCUMENTS

| | | | | |
|---|---|---|---|---|
| 5,233,354 | A * | 8/1993 | Roth et al. ............... | 342/160 |
| 7,924,212 | B2 * | 4/2011 | Benitez et al. ........... | 342/28 |
| 2002/0169735 | A1 * | 11/2002 | Kil et al. .................. | 706/46 |
| 2007/0052578 | A1 * | 3/2007 | Ramakrishnan ......... | 342/90 |
| 2008/0260239 | A1 * | 10/2008 | Han et al. ................ | 382/156 |
| 2009/0144053 | A1 * | 6/2009 | Tamura et al. .......... | 704/207 |
| 2009/0146869 | A1 * | 6/2009 | Dwelly et al. ........... | 342/193 |
| 2012/0059657 | A1 * | 3/2012 | Willey et al. ............ | 704/256.1 |

OTHER PUBLICATIONS

Bilik, I.; Tabrikian, J.; Cohen, A., "GMM-based target classification for ground surveillance Doppler radar," Aerospace and Electronic Systems, IEEE Transactions on , vol. 42, No. 1, pp. 267,278, Jan. 2006. doi: 10.1109/TAES.2006.1603422.*
Zhou De-Quan; Guo Yan-Qing, "Study of Radar Target Identification Based on Cepstrum and Complex Cepstrum," Microwave, Antenna, Propagation and EMC Technologies for Wireless Communications, 2007 International Symposium on , vol., no., pp. 993,996, Aug. 16-17, 2007.*
Zunhua Guo; Shaohong Li, "One-Dimensional Frequency-Domain Features for Aircraft Recognition from Radar Range Profiles," Aerospace and Electronic Systems, IEEE Transactions on , vol. 46, No. 4, pp. 1880,1892, Oct. 2010.*

* cited by examiner

*Primary Examiner* — Jeffrey A Gaffin
*Assistant Examiner* — David H Kim
(74) *Attorney, Agent, or Firm* — Maginot, Moore & Beck (57) ABSTRACT

A method of detecting movement includes using a radar sensor to monitor a space, and receiving an output signal from the radar sensor. A Fourier transform is performed on the output signal to produce a frequency domain signal spectrum. The frequency domain signal spectrum is transformed into an acoustic domain signal. It is decided whether the output signal is indicative of movement of a predetermined object or a non-human animal dependent upon at least one feature of the acoustic domain signal and at least one spectral feature of the signal spectrum.

20 Claims, 12 Drawing Sheets

METHOD FOR DETECTION OF MOVEMENT OF A SPECIFIC TYPE OF OBJECT OR ANIMAL BASED ON RADAR SIGNALS

BACKGROUND OF THE INVENTION

1. Field of the Invention

The present invention relates to systems for detecting movement, and, more particularly, to systems that detect movement of a specific type of object or animal.

2. Description of the Related Art

Surveillance systems, also known as security systems, are known to include security devices, such as motion detectors, for sensing the presence of human activity. A problem with such motion detectors is that they are unable to discern between activity produced by humans and activity produced by pets or other moving objects like blinds or fans. Consequently, households that include pets may need to disable the motion detectors of their security systems in order to avoid false alarms.

Activity classification, for example Human-only detection (HoD) is an attempt to achieve robust detection of human activities while ignoring all other moving objects. It is a very challenging task mostly because such detection may call for some intelligence in the first place as to what characterizes human activities and what does not.

Some attempts at human activity detection have been based on the use of radar sensing technology. Radar has some obvious advantages in surveillance applications. Radar is inexpensive and easy to deploy on a large scale. In contrast to video cameras, radar may work covertly and can be functional continuously, 24/7, both days and nights. A disadvantage of radar, however, may be that its output is not so straightforward to visualize or translate into useful information.

In the current literature, the state-of-the-art method of radar based human detection involves modeling human activities. Specifically, an attempt is made to model each individual body part and its corresponding response in the radar signals and estimate the most likely activity being observed given the currently received signal. This type of approach is similar to the subsource fitting and yields reasonable performance as long as the human being detected is acting in a normal fashion, e.g., walking with a constant rate of arm swings. A problem may arise when an intruder tries to trick the system by acting in an unusual fashion. In such cases, the intruder's actions almost never match the ideal action model, and hence the system does not identify the intruder as being human. Moreover, it is not clear how such a system will perform if other activities occur, such as a pet walking around. Finally, known methods employ only a continuous wave (CW) type of radar.

In addition to applications in security systems, it would be advantageous in other applications to be able to identify movement as being movement from a specific type of object or animal. For example, in automotive applications, if movement surrounding a vehicle could be identified as that of a large truck, a smaller automobile, a deer, a motorcycle, or a bicycle, automatic driving control systems could better determine when to take control of the vehicle, and what type of evasive action to take.

What is neither taught nor suggested in the art is a system that can effectively discriminate between the movements of a specific type of object or animal and movements of all other types of objects or animals.

SUMMARY OF THE INVENTION

The present invention provides a method of detecting movement by a specific type of object or non-human animal based on radar signals. The method of the invention may discriminate between the movement by a specific type of object or animal (which hereinafter may be referred to as "specific movement(s)") and movements by any other type of object or animal (which hereinafter may be referred to as "other movement(s)"). Acoustic features that are observable in the radar signal may be used to discriminate between specific movements and other movements, and thus may be used to detect movement by a specific type of object or animal. An additional set of spectral features (e.g., spectral flatness, spectral kurtosis, etc.) may be combined together with the aforementioned acoustic features to constitute the feature space utilized by the invention. State-of-the-art machine learning approaches, for example multi-layer perceptron (MLP) neural nets and support vector machine (SVM), may be devised and trained individually to the system to tackle the specific/other movement classification problem. Lastly, to achieve more robust detection, a frame-level joint decision strategy based on taking neighboring frames into account may significantly improve the rate of detection as well as a reduction in the occurrence of false detections. The present invention may be embodied in many forms. For example, the present invention may be an embedded system such as software on a chip or implemented in any computer language such as by use of MATLAB, and then may be deployed on LabVIEW for real-time experimentation. Quantitative results indicate that the method of the invention is very accurate in detecting specific movements. Detection of specific movements, like other classification problems, may call for finding the most relevant features that can best represent the discrepancies between classes.

In one embodiment, radar of continuous wave (CW) type is employed in the present invention. However, it is also possible to employ conventional pulsed radar.

In one embodiment, a set of twenty-five dimensional features are extracted within each time frame, and differences between human and nonhuman activities are identified in this feature space. Machine learning techniques such as Multilayer perceptron (MLP) and support vector machine (SVM) may be trained and devised individually to the system. To achieve more robust detection, frame-level decisions may be made by taking neighboring frames into account.

The invention comprises, in one form thereof, a method of detecting movement, including using a radar sensor to monitor a space, and receiving an output signal from the radar sensor. A Fourier transform is performed on the output signal to produce a frequency domain signal spectrum. The frequency domain signal spectrum is transformed into an acoustic domain signal. It is decided whether the output signal is indicative of movement of one of a predetermined object and a non-human animal dependent upon at least one feature of the acoustic domain signal and at least one spectral feature of the signal spectrum.

The invention comprises, in another form thereof, a method of detecting movement, including using a radar sensor to monitor a space. An output signal is received from the radar sensor. A Fourier transform is performed on the output signal to produce a frequency domain signal spectrum. The frequency domain signal spectrum is transformed into an acoustic domain signal. A plurality of features are extracted from the acoustic domain signal. The features are passed through a classifier. The classifier is used to decide whether the output signal is indicative of movement of a predetermined object or a predetermined non-human animal. The deciding is dependent upon at least one of the features of the acoustic domain signal.

In general, the problem may be a multiclass classification problem. Thus, the classifier can be used to determine the particular class (type of animal or object) of the source of motion that the features belong to. The output of the classifier can be any of the classes: A or B or C or D or E, etc, where A, B, D, etc. are the trained classes, e.g., A=dog, B=car, C=fan, D=truck, etc.

The invention comprises, in yet another form thereof, a method of detecting movement, including using a radar sensor to monitor a space, and receiving an output signal from the radar sensor. A series of frames is produced based on the radar sensor output signal. Each of the frames overlaps at least one adjacent frame with respect to time. A discrete-time short-time Fourier transform is performed on at least one of the frames to produce a signal spectrum. The power spectrum of the radar sensor output signal is mapped into a plurality of acoustic features by use of triangular mapping windows. A discriminative model is trained as a classifier. The acoustic features and a plurality of spectral features of the signal spectrum are passed through the classifier. The classifier is used to decide whether the output signal is indicative of movement of a predetermined object or a predetermined non-human animal.

The invention comprises, in still another form thereof, a method of detecting movement, including using a radar sensor to monitor a space. An output signal is received from the radar sensor. The output signal is translated into acoustic levels by modifying a sampling rate of the output signal. A set of unique features related to motion activities is extracted from the output signal in an acoustic domain. The features are passed through the classifier. The classifier is used to decide whether the output signal is indicative of movement of a predetermined object or a predetermined non-human animal.

BRIEF DESCRIPTION OF THE DRAWINGS

The above mentioned and other features and objects of this invention, and the manner of attaining them, will become more apparent and the invention itself will be better understood by reference to the following description of embodiments of the invention taken in conjunction with the accompanying drawings, wherein.

Corresponding reference characters indicate corresponding parts throughout the several views. Although the exemplification set out herein illustrates embodiments of the invention, in several forms, the embodiments disclosed below are not intended to be exhaustive or to be construed as limiting the scope of the invention to the precise forms disclosed.

DESCRIPTION OF THE PRESENT INVENTION

Figure 1:
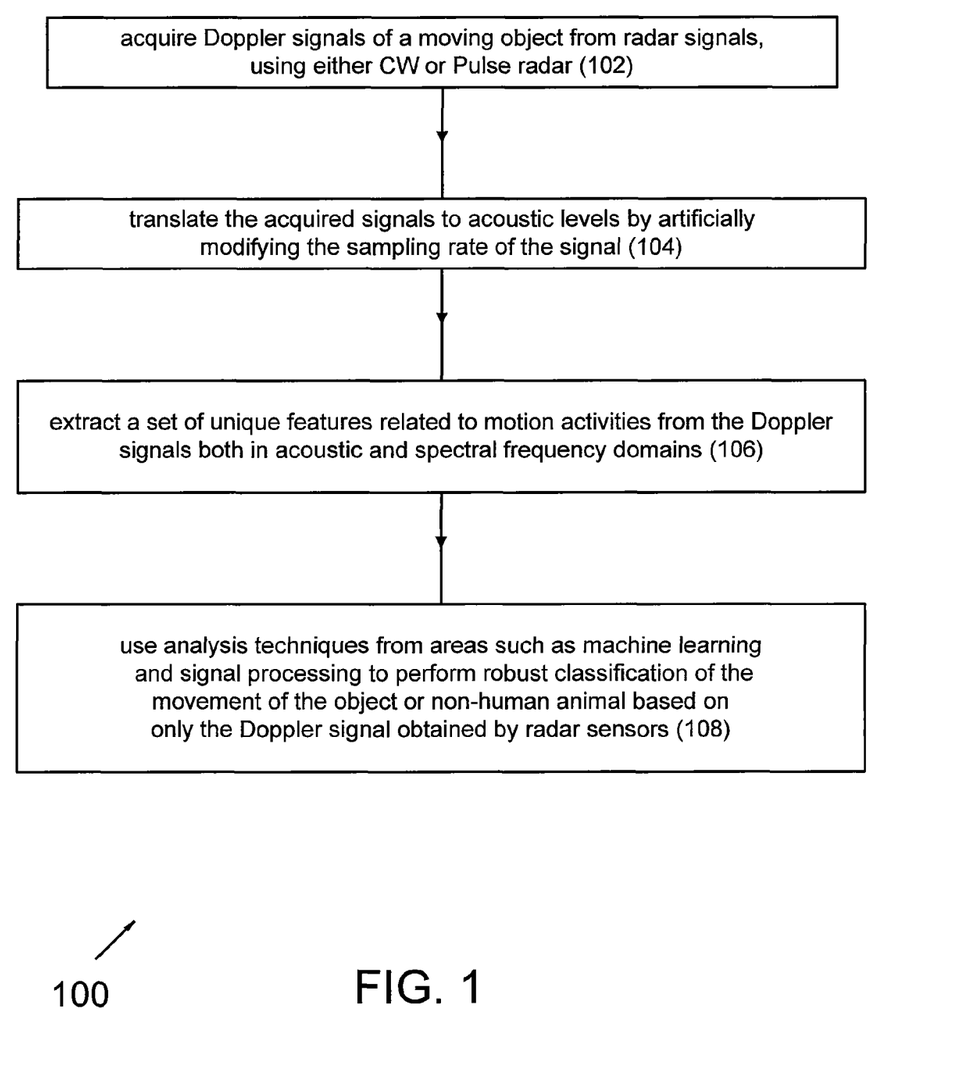
FIG. 1 is a flow chart of one embodiment of a specific movement detection method of the present invention.

Referring now to the drawings and particularly to FIG. 1, there is shown one embodiment of a specific movement detection method 100 of the present invention. In a first step 102, Doppler signals of a moving object are acquired from a radar signal, using either continuous wave radar or pulse radar. For example, a radar sensor may be installed on a motor vehicle and may be directed in a direction that is forward, rearward, and/or in either or both of the lateral directions relative to a driving direction of the vehicle. Rebounded Doppler signals may be received from an object or non-human animal that is near the vehicle, such as a semi-trailer truck; another automobile; a motorcycle; a bicycle; a post; a tree; a falling branch; a falling or thrown rock or brick; a deer; a specific type of animal predator (e.g., a coyote, wolf or bear); a dog; or a bird, for example.

In a second step 104, the acquired signal is then translated to acoustic levels by artificially modifying the sampling rate of the signal. That is, the sampling rate may be selected such that components of the sampled signal are within the frequency range that human beings are capable of hearing.

Next, in step 106, a set of "unique features" related to or indicative of motion activity are extracted from the Doppler signal both in the acoustic and spectral frequency domains. As described in detail hereinbelow, at least nineteen features indicative of motion may be extracted from the Doppler signal in the acoustic domain, and six additional features indicative of motion may be extracted from the Doppler signal in the spectral frequency domain. It is to be understood that this embodiment including nineteen features in the acoustic domain and six features in the spectral frequency domain is merely an example. Additional features may be extracted from the Doppler signal in either or both of the acoustic domain and the spectral frequency domain.

In a final step 108, the system uses analysis techniques from areas such as machine learning and signal processing to perform robust classification of the movement of the object or non-human animal based on only the Doppler signal obtained by one or more radar sensors. For example, an electronic processor may determine whether a digitized version of the Doppler signal includes enough of the nineteen features in the acoustic domain and the six features in the spectral frequency domain to determine that the Doppler signal is a result of movement by a predetermined object or a predetermined non-human animal.

Figure 2:
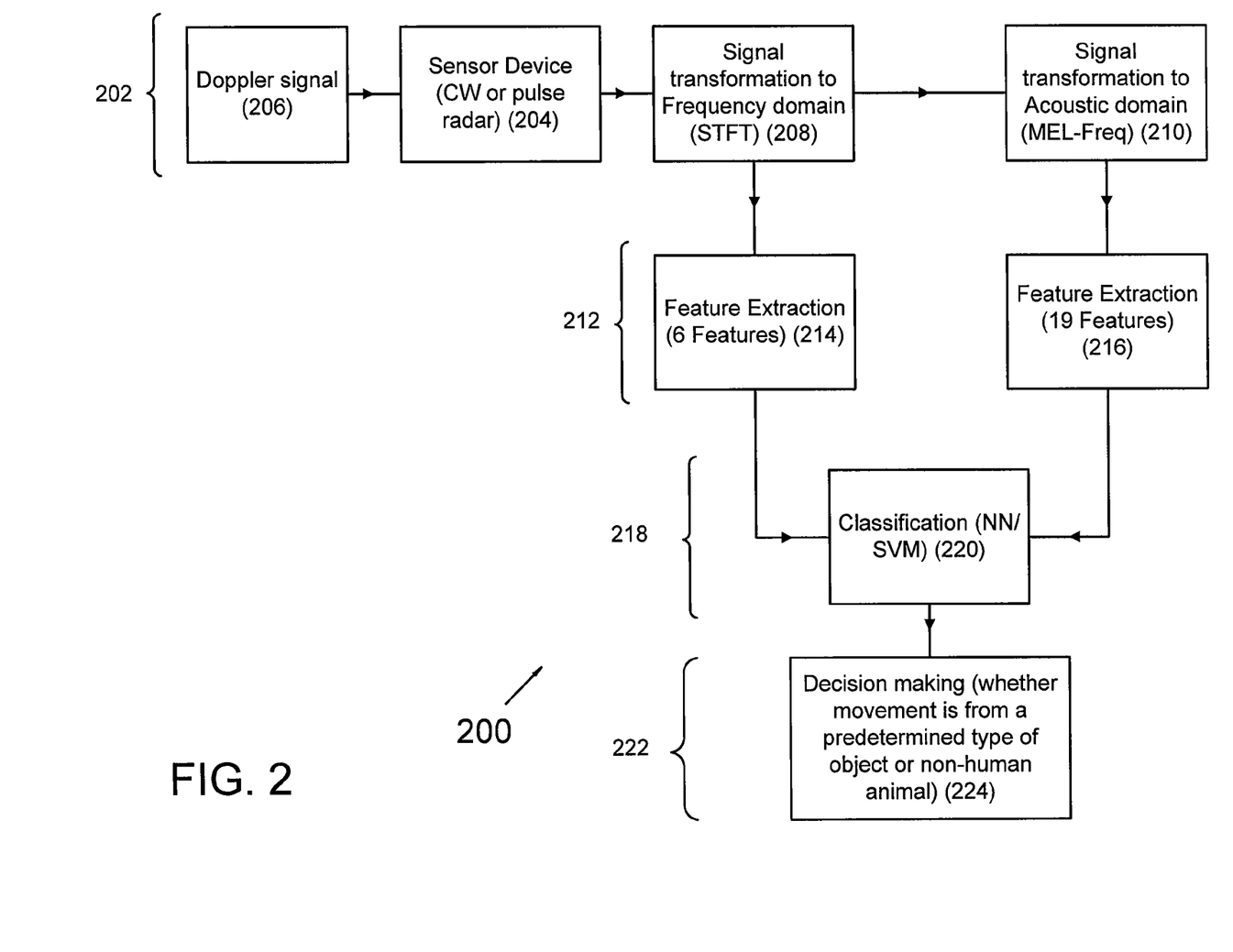
FIG. 2 is a block diagram of one embodiment of a specific movement detection system of the present invention.

One embodiment of a specific movement detection system 200 of the present invention is shown in FIG. 2. System 200 may be provided for a motor vehicle, boat or airplane, etc. However, system 200 may also be provided for a structure, such as a building, or for other spaces, such as outdoor areas, subterranean rooms and passages, and zones of air space. System 200 includes an acquisition stage 202 having a sensor device 204 for receiving a Doppler signal 206. Sensor device 204 may be capable of detecting either CW or pulse radar. Sensor device 204 may capture Doppler signal 206 as the Doppler signal comes from a moving target. This signal is then acquired and sampled by using a data acquisition device, which translates the analog Doppler signal to the digital domain. This signal is then communicated and input to the Analyzer sub-system, which processes the measurement, extracts relevant features from the data, and then determines whether the moving target can be identified as a predetermined type of object or non-human animal.

Acquisition stage 202 also includes a signal transformation block 208 for transforming the received Doppler signal 206 into the frequency domain, such as via a short time Fourier transform (STFT). Acquisition stage 202 further includes a signal transformation block 210 for transforming the frequency domain signal from block 208 into the acoustic domain, such as via a Mel-frequency cepstrum.

A good set of features may contribute heavily to the success of discriminating between movements of a predetermined type of object or a predetermined type of non-human animal and movements of other types of objects and animals. A feature extraction stage 212 includes a block 214 for extracting a set of features that have been found to characterize movements of a predetermined type of object or non-human animal in the frequency domain. In one embodiment, there are six such features in the set corresponding to the frequency domain. Feature extraction stage 212 also includes a block 216 for extracting a set of features that have been found to characterize movements of a predetermined type of object or non-human animal in the acoustic domain. In one embodiment, there are nineteen such features in the set corresponding to the acoustic domain.

A classification stage 218 includes block 220 that may use neural networks (NN) and/or support vector machines (SVM). A decision making stage 222 includes a block 224 that decides whether the movement is that of a predetermined type of object or non-human animal.

With regard to a radar signal as audio (e.g., sound waves), human hearing is capable of discerning between movements of different types of objects and animals. In other words, our ears can discern between audio signals from different types of objects. Therefore, this analogy can be used to analyze the radar signals in acoustic. Thus, ideas from other disciplines (e.g., audiology and psychoacoustics) can be borrowed for use in the classification task. In fact, when visualizing the radar signal in the time-frequency domain, significant differences between movements of different types of objects and animals can be observed, as in FIGS. 3a and 3b, which are raw output of the radar sensor. The plot of FIG. 3a corresponds to human movement, and the plot of FIG. 3b corresponds to the movement of a dog. Striking differences between the plots of FIGS. 3a and 3b may be observed.

Figure 3A:
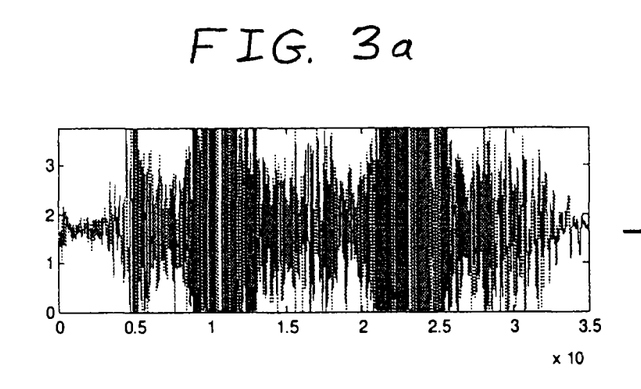
FIG. 3a is a plot of example output amplitudes of a radar detector versus time when sensing the movements of a human.
Figure 3B:
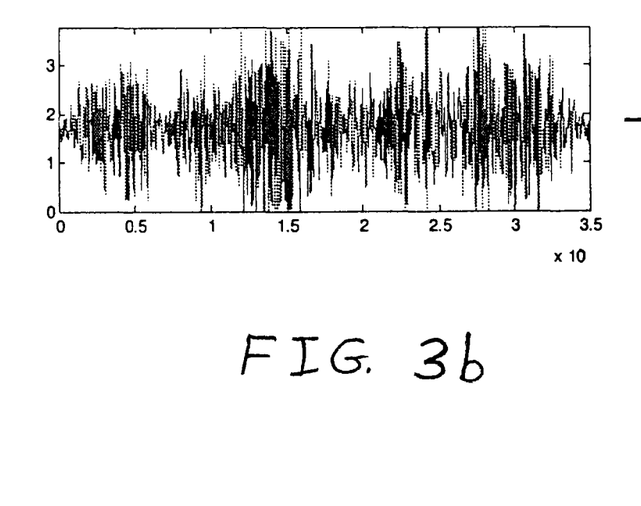
FIG. 3b is a plot of example output amplitudes of a radar detector versus time when sensing the movements of a dog.
Figure 3C:
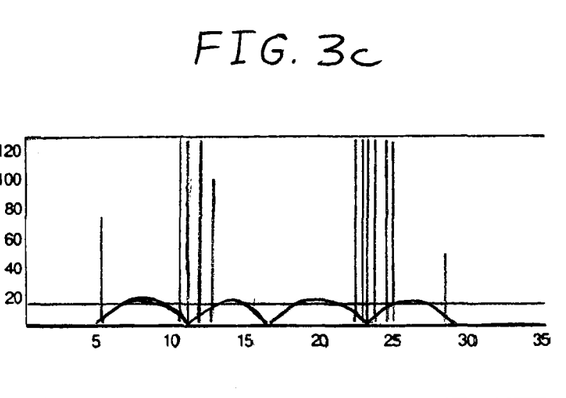
FIG. 3c is a plot of example output frequencies of a radar detector versus time when sensing the movements of a human.
Figure 3D:
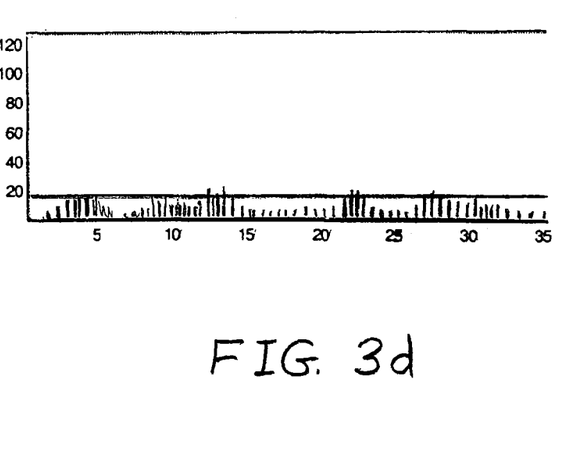
FIG. 3d is a plot of example output frequencies of a radar detector versus time when sensing the movements of a dog.

FIGS. 3c and 3d are frequency-as-a-function-of-time representations, e.g., spectrograms, of FIGS. 3a and 3b, respectively. The plots of FIGS. 3c and 3d may be obtained by performing short-time Fourier transform (SIFT) on the time domain signals of FIGS. 3a and 3b, respectively. In one embodiment, the window length may be set to 200 samples, with a 100 sample overlap. Given a signal sampling frequency of 2 kHz, the window length may be expressed as 0.1 second, and the overlap may be expressed as 0.05 second. A Fourier transform on overlapping frames is sometimes referred to as a Discrete-time SIFT. The spectral frequency plots of FIGS. 3c and 3d may have a greater degree of difference between them than do the time domain plots of FIGS. 3a and 3b. With this being the case, spectral analysis may be the better representation and the better basis for feature extraction. In addition, psychoacoustic study may provide clues on how to extract effective acoustic/perceptual features. It is to be understood that the plots of FIGS. 3c and 3d may be three-dimensional plots in the sense that different colors or a third axis may be used to indicate the intensity or amplitude at each set of frequency-time coordinates.

Figure 4A:
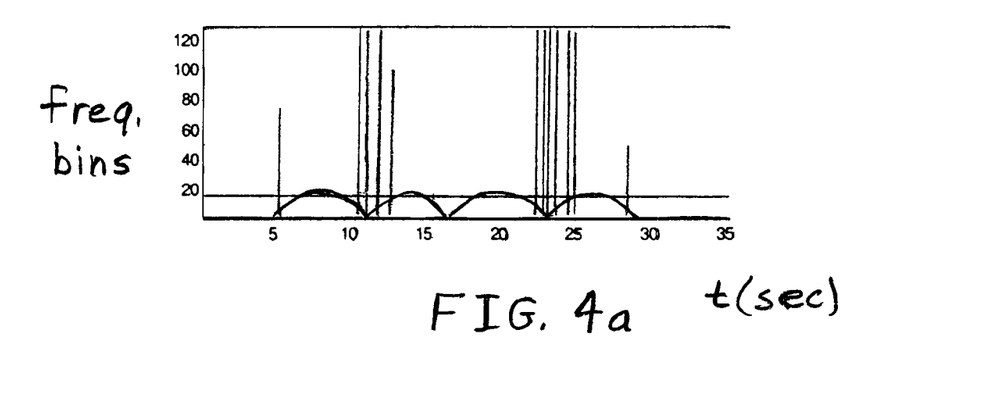
FIG. 4a is a power spectrum plot of example output frequencies of a radar detector versus time when sensing the movements of a human as in one embodiment of a feature extraction method of the invention.
Figure 4B:
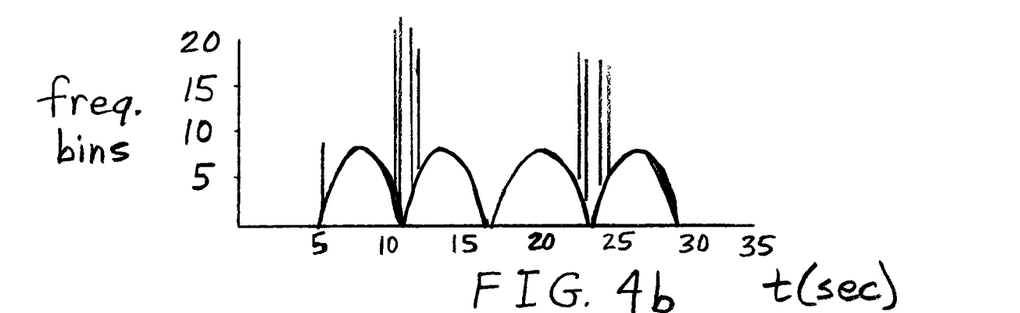
FIG. 4b is a mel scaled power spectrum plot as in one embodiment of a feature extraction method of the invention.

One embodiment of a feature extraction procedure of the invention is depicted in FIGS. 4a-b. Similarly to the plot of FIG. 3c, the power spectrum plot of FIG. 4a may be obtained by performing STFT, taking the Fourier transform of a windowed signal from radar output. As described above, the window length may be, for example, 200 samples with an overlap of 100 samples.

Figure 5:
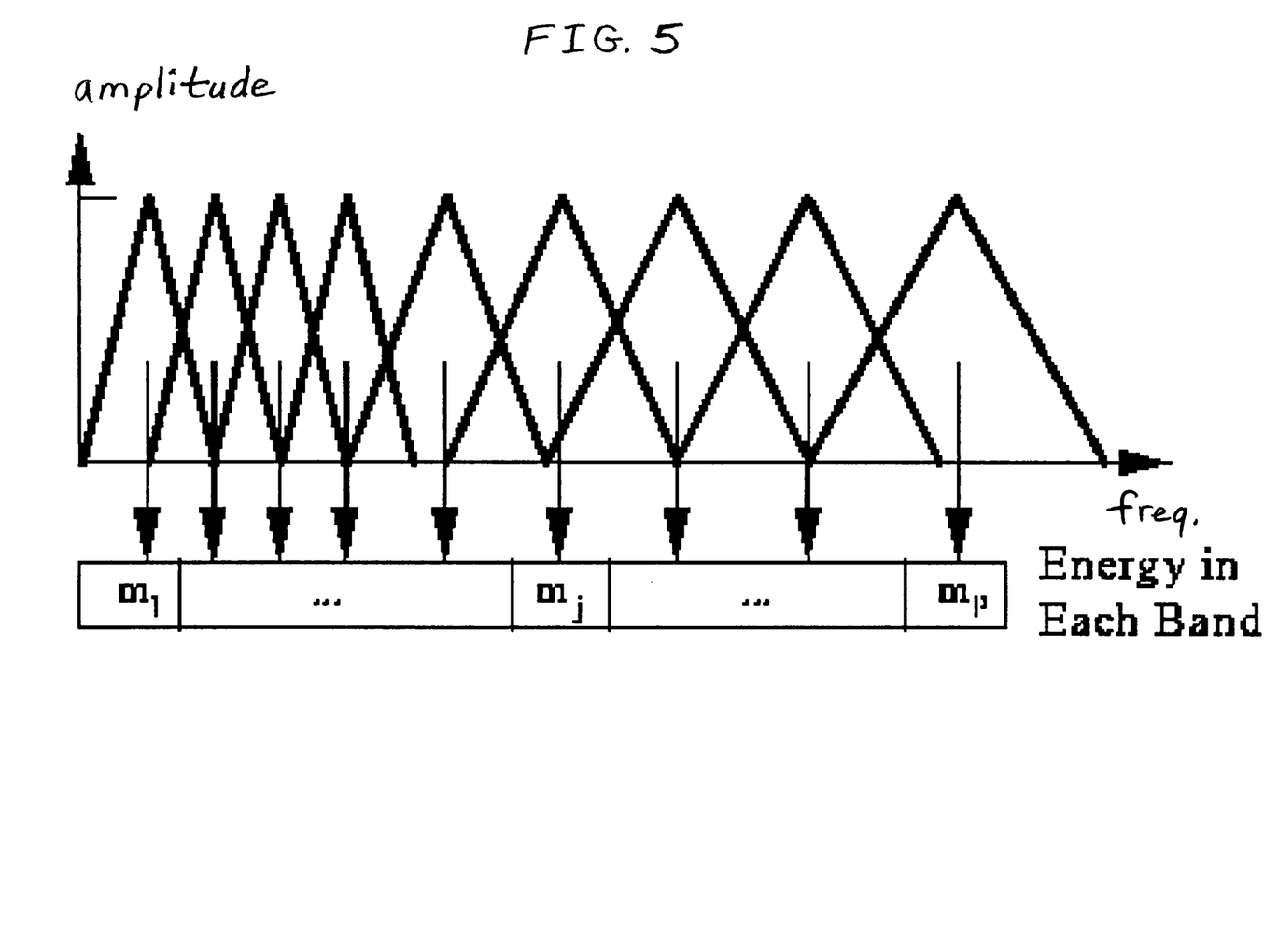
FIG. 5 is a plot of a triangular Mel-scale filterbank being applied to a plot of amplitude versus frequency according to one embodiment of the invention.

The mel-scaled power spectrum plot of FIG. 4b may be obtained by mapping the powers of the spectrum obtained from FIG. 4a onto the Mel scale, using triangular overlapping windows on the frequency axis. Such mapping onto the Mel scale is illustrated in FIG. 5. More particularly, a triangular filterbank that is equally spaced on the mel-frequency scale is provided. The spacing may be, for example, 150 mels, and the bandwidth may be 300 mels. Mel-to-Hz conversions may be defined by frequency=700(exp(mel/1127.01048)−1). Thus, the first channel ranges from 0 Hz to 336 Hz; the second channel ranges from 294 Hz to 384 Hz, and so on. Overlapping triangles may be used in order to reduce artifacts at the boundaries. Energy in each of nineteen of twenty frequency bands or frequency bins (except for the DC component, which is removed) in Mel-frequency may be determined, resulting in a power spectrum of nineteen spectral features. This process may mimic a perceptual scale of pitches by human listeners.

Concretely, the Mel scale produces high resolution in the low frequency regions, while compressing the high frequency regions. As a result, the feature dimension may be reduced from 129 features in FIG. 4a to twenty features in FIG. 4b. Thus, acoustic features may be extracted by first taking the Fourier transform of a windowed excerpt of the radar signal with a window length of 200 samples and an overlap of 100 samples. Second, triangular overlapping filters may be used to map the power spectrum onto the Mel scale, and the first dimension may then be removed as it is constant (the DC component).

In addition to the nineteen dimensional acoustic features discussed above, another set of spectral features may be determined. This second set of features may tend to enhance the discriminating ability of the first set of nineteen features. In one embodiment, there are six additional features, including spectral flux, spectral flatness, normalized energy, spectral centroid, spectral kurtosis, and spectral bandwidth.

As described above, twenty-five features may be extracted for the object/non-human animal classification task, including nineteen acoustic features and six spectral features. These features may then be fed into a classifier, as described below.

Detection of a specific type of object or non-human animal may be regarded as a classification task for determining whether a moving thing belongs to an specific type of object or non-human animal (trained classes A, B, C, D, etc.) or is something else (class 0). In this reformulation, machine learning techniques can be used to build classifiers to fulfill the task. For example, neural networks (NN) and support vector machines (SVM) may be employed.

Figure 6:
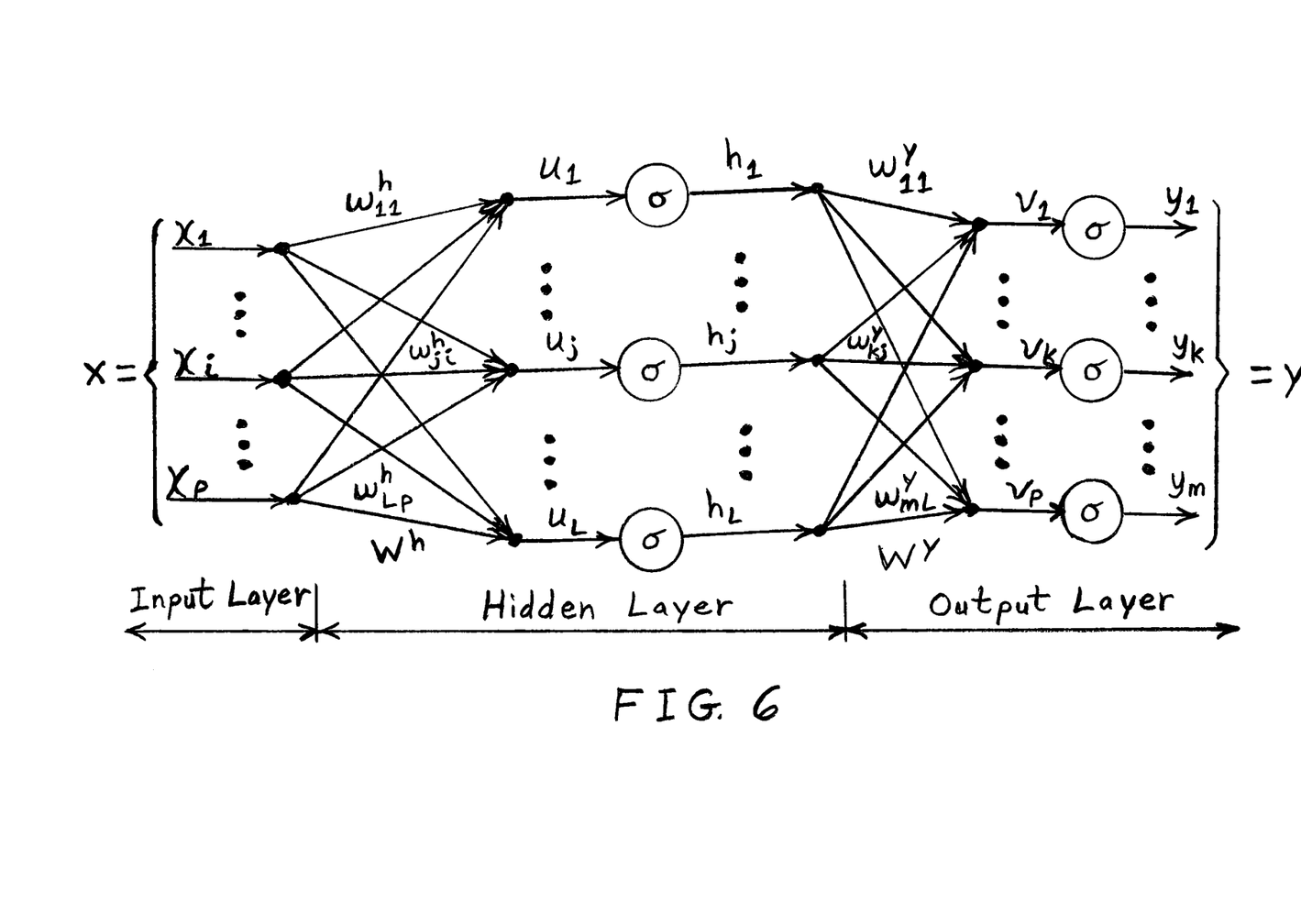
FIG. 6 is a diagram illustrating the topology of multi-layer perceptron with an input layer, a hidden layer, and an output layer according to one embodiment of the present invention.

For example, two systems may be developed, using MLP and SVM respectively. There are several Multi-class classifiers schemas, MLP and SVM are examples of classifiers. MLP is a feedforward neural network that has a structure as shown in FIG. 6. In this particular task, the feedforward neural network may have a structure that has twenty-five input nodes, fifty hidden nodes, and one output node. The size of the input layer and the output layer may be problem-dependent, and thus the size of the input layer and the output layer may not be changed. Multi-class pattern classification can be perform using either a system of multiple neural networks or a single neural network, and modeling pattern classes using one-against-all, one-against-one, one-against-higher-order, etc. Furthermore, there are a number of different approaches to decompose a multi-class pattern classification problem into two-class problems. For example, in one embodiment there are twenty-five features, and thus the number of input nodes may be set to twenty-five. Because the task may be to classify, only one binary output of "0" or "1" may be called for, and thus the size of the output layer may be set to one node. However, the size of the hidden layer may not be explicitly defined and it may play an important role in the behavior of the model. An issue is, if the hidden nodes are too few, then the model may not solve the problem well (e.g., low accuracy), but if there are too many hidden nodes, the model may over-fit the training data and lose the ability to generalize. Therefore, deciding the number of hidden nodes may involve finding a tradeoff point. Here, a cross-validation technique may be used to select fifty as the number of hidden nodes to optimize the tradeoff. The transfer function used in each hidden node may be a tangent hyperbolic. One possible training method that may be used is Levenberg-Marquardt backpropagation, which is referred to as "trainlm" in MAT-LAB.

Figure 7:
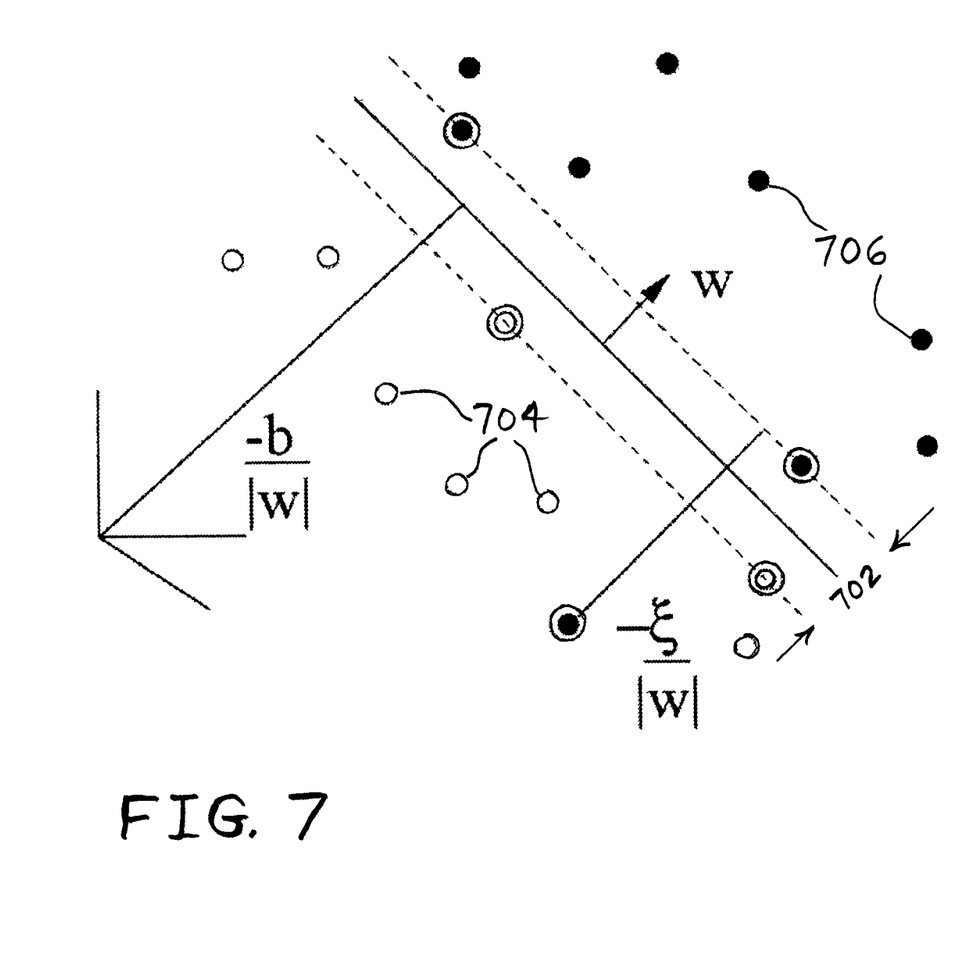
FIG. 7 is a support vector machine plot according to one embodiment of the present invention.

SVM is another type of discriminative model that may be trained as a classifier. An advantage of SVM may lie in its maximum margin property. SVM attempts to maximize the margin of two classes, thereby making it easier to generalize toward unforeseen test data. In the simple two-dimensional support vector machine diagram of FIG. 7, the margin of two classes may be represented by a distance 702 between the two dashed lines, wherein elements of one class are represented by circles 704, and elements of the other class are represented by dots 706 (i.e., filled-in circles). In one embodiment, radial basis function (RBF) may be chosen as a kernel method, which virtually extends the feature space into infinite dimensions. RBF width may be set to 0.2 and slack may be set to 1 (for soft margin classifier). Like the number of hidden nodes in MLP, these two parameters here may affect SVM performance.

Once a classifier (either MLP/NN or SVM) is properly trained, it can be applied to label unforeseen data at the frame level. In a real time application, the system may take a windowed slice of radar signal as the input, and extract therefrom the corresponding twenty-five dimensional features. The system may then pass the twenty-five dimensional features through the classifier, and then output a label for that frame (the specific type of object or non-human animal=A, B, C, D, etc.; or, if the multi-class pattern classification problem is decomposed into a two-class problem, =1 or something else=0).

Figure 8A:
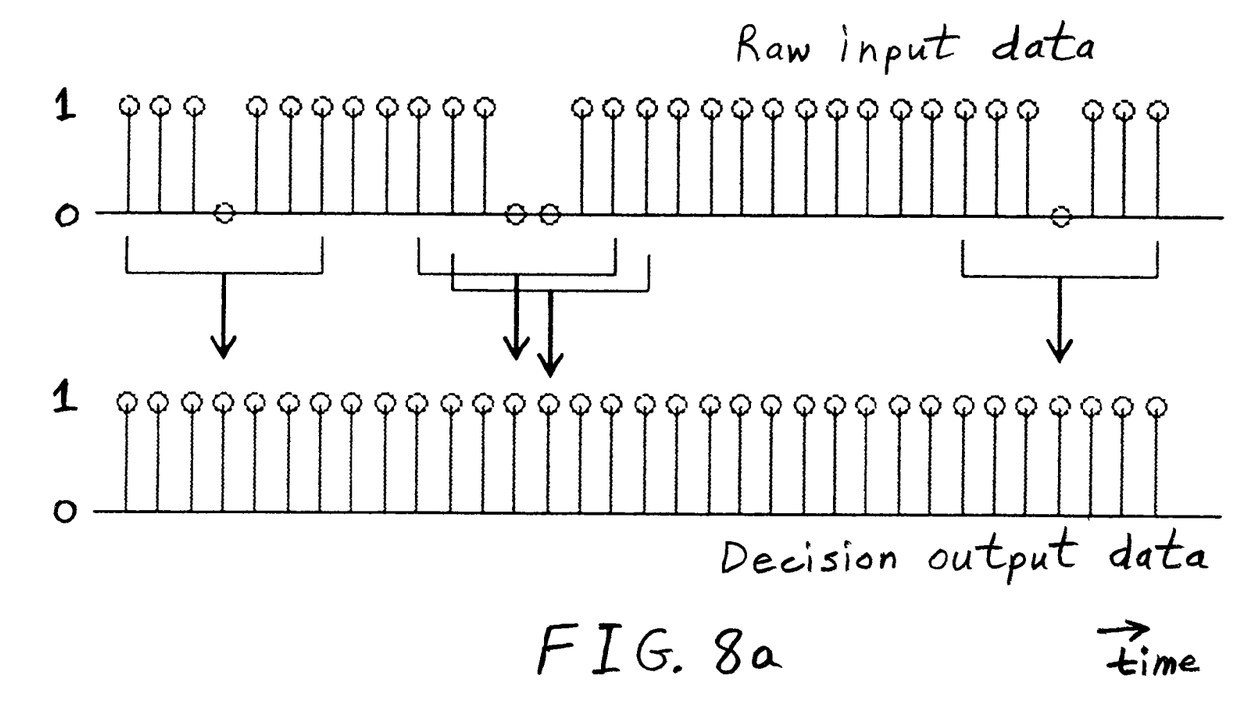
FIG. 8a is a diagram illustrating one embodiment of a two class decision-making process of the present invention.

The above-described process embodiment provides a basic way of making decisions of whether movement is caused by a specific type of object or non-human animal. However, the reliability of this method may suffer in the event that one frame is too short and error-prone. Thus, another embodiment of the invention provides another process for robust detection of a specific movement. Particularly, information from neighboring frames may be incorporated in making joint decisions. A specific embodiment of this process is illustrated in FIG. 8a, wherein the top diagram represents a stream of binary raw input data, with "1" indicating a specific movement, and "0" indicating another movement. The bottom diagram of FIG. 8a represents a stream of binary decision output data, which may be considered a moving average (or median filter) of the raw input data. In the specific embodiment depicted in FIG. 8a, each frame of decision output data may be a binary moving average of a corresponding set of seven consecutive frames in the raw input data. Thus, instead of looking at just a single frame, a number of preceding frames and a number of succeeding frames are also considered in jointly deciding whether the frame in question is associated with a specific movement or another movement. In such a way, sporadic errors can be absorbed and the error rate can be greatly reduced.

Figure 8B:
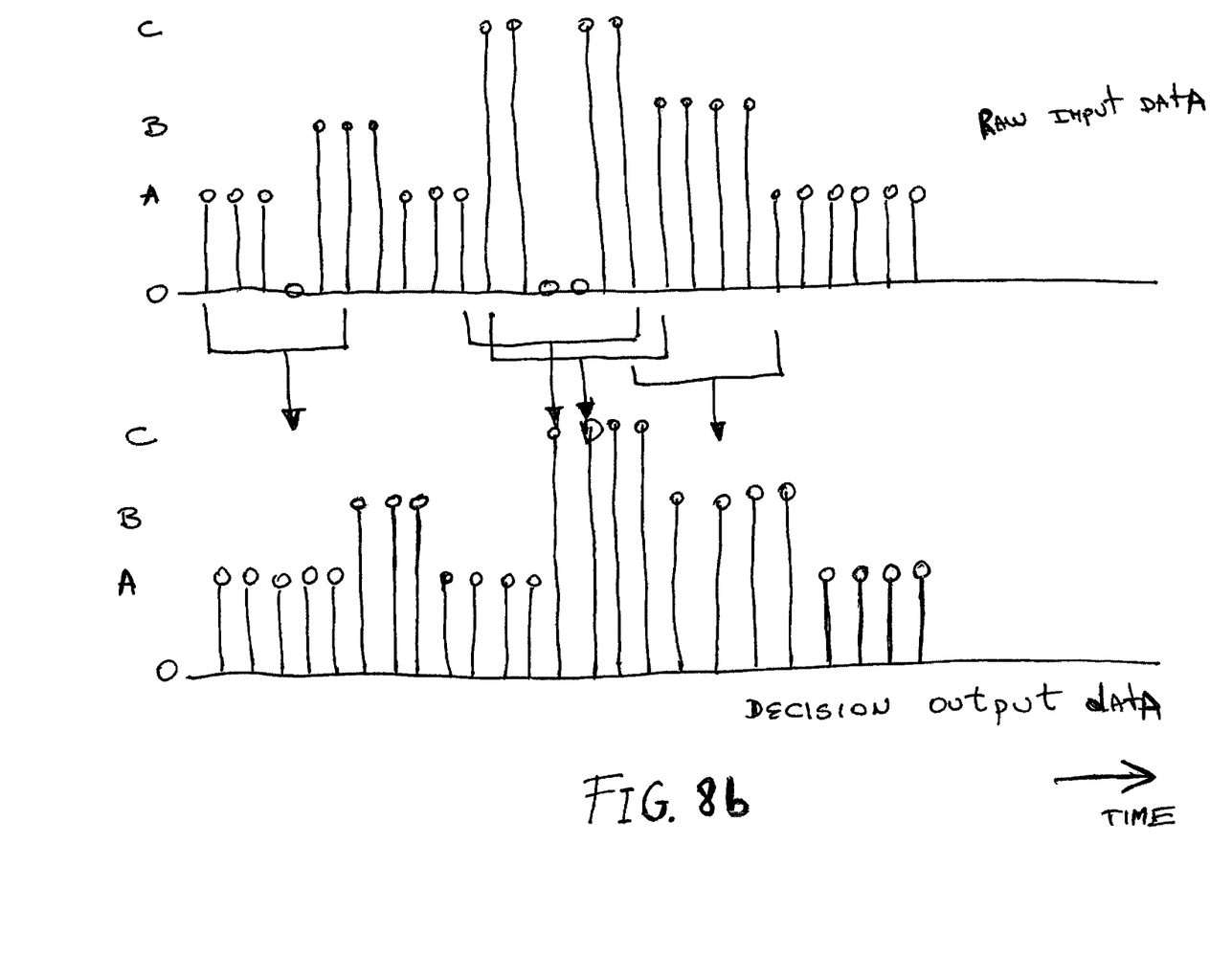
FIG. 8b is a diagram illustrating one embodiment of a greater-than-two class decision-making process of the present invention.

The above two-class problem can be extended to a multi-class problem. The same majority vote per frame schema can be applied to determine the class. In FIG. 8a, the process is illustrated with 1 and 0 (two classes). However, the process can be extended to several classes (e.g., 0, A, B, C), as shown in FIG. 8b, with each class representing a different source of movement. In FIG. 8b, the top diagram represents a stream of binary raw input data, with "0", "A", "B" and "C" each indicating a different, respective, specific movement. The bottom diagram of FIG. 8b represents a stream of binary decision output data, which may be considered a moving average (or median filter) of the raw input data. In the specific embodiment depicted in FIG. 8b, each frame of decision output data may be a binary moving average of a corresponding set of seven consecutive frames in the raw input data. Thus, instead of looking at just a single frame, a number of preceding frames and a number of succeeding frames are also considered in jointly deciding whether the frame in question is associated with a specific movement or another movement. In such a way, sporadic errors can be absorbed and the error rate can be greatly reduced.

The selection of the decision length (i.e., how many neighboring frames to consider) may affect the level of detection performance. Thus, when choosing the decision length, there may be tradeoff between robustness and resolution. In other words, if the decision length is too long, then the detection process may correct more errors, but the resolution (or sensitivity) may be reduced at the same time.

Figure 9:
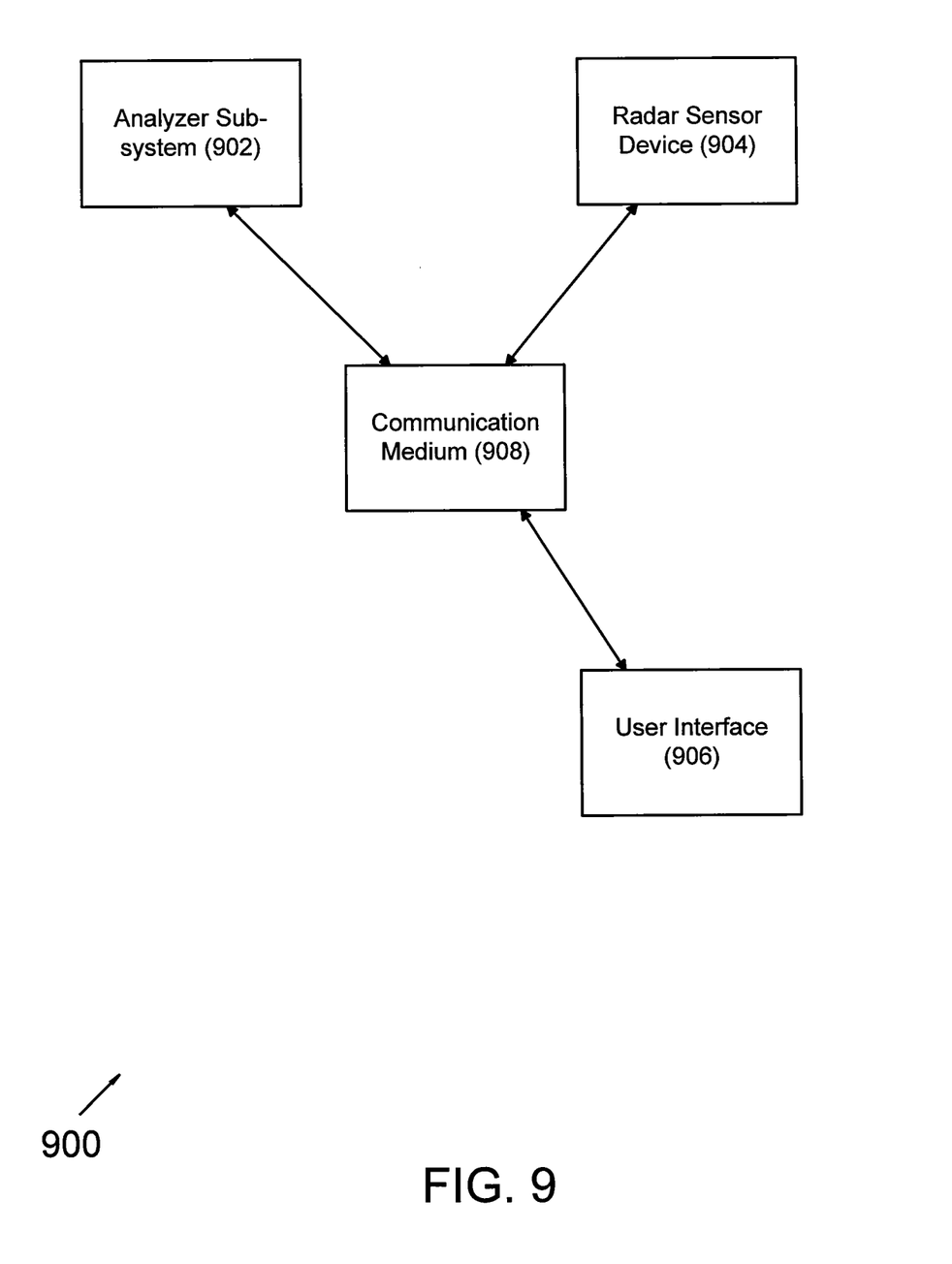
FIG. 9 is a block diagram of one embodiment of a specific movement detection system of the present invention.

A specific movement detection system 900 of the present invention illustrated in FIG. 9 may include an analyzer sub-system 902, a radar sensor device 904, a user interface 906, and a communication medium 908. Analyzer sub-system 902, which may include an electronic processor, may physically reside either next to the radar sensor device 904 (or the sensor may be a part of the analyzer sub-system), or the analyzer sub-system may reside at some other location. The analyzer sub-system may analyze and report information regarding device use, performance, energy consumption, use trends, costs, etc. to a user interface 906. User interface 906 may be in the building, a personal mobile phone device, or a web interface. Communication between analyzer sub-system 902 and user interface 906 (and/or between analyzer sub-system 902 and sensor device 904 if not part of the same unit)

may take place via communication medium 908, which may be in the form of power line communication, wireless communication, or some other direct medium such as Ethernet or coaxial cable, for example.

In one data acquisition experiment, two sets of specific movements are used as input to be sensed, one set being specific objects, and the other set being non-human animals. In the experiment, the radar output sampling frequency may be set to 2 kHz for both channels, although eventually only the first channel may be used for detection. Each case may be performed and data associated therewith may be recorded into .txt files. A data size of about 30,000 frames of data per type of object or non-human animal may be considered adequate for training given the feature dimension.

The training process may call for true object/non-human animal labels. Thus, a semi-manual labeling may be performed. When recording data, what happens in a certain range of time may be largely known. For example, it may be known that a certain type of non-human animal movements occur during a certain time period of recording. Thus, all frames may be labeled as that certain type of non-human animal in this period of time once energy surpasses a certain threshold.

Figure 10:
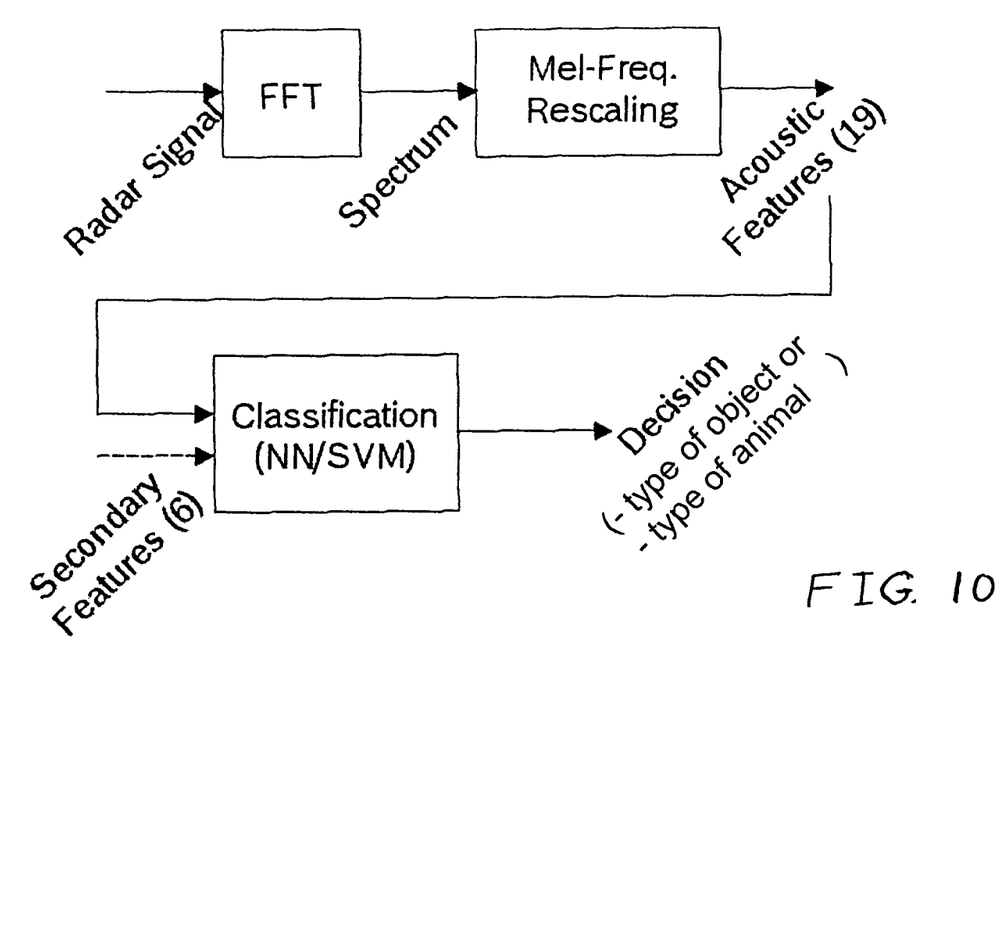
FIG. 10 is a flow chart of one embodiment of a method of the present invention including feature extraction, classification, and decision making.

Given features and true labels as a pair, classifiers can be taught to establish such a mapping. As discussed above with regard to classification, MLP and SVM can be trained in similar ways. The dataset may be randomly split into training and test. The training set may have about 25,000 frames per type of object or non-human animal, and the remainder of the data may be used for test. The use of an equal number of data instances in both classes may inhibit the classifier from biasing to either class due to unequal class priors. Training may take some period of time (e.g., a matter of hours), but testing may be performed in real time. Thus, the whole process, including feature extraction, classification and decision making, may take no longer than 0.05 second (1/frame rate). This process is discussed above stage-by-stage, and a flow chart of the process is illustrated in FIG. 10. MLP may perform faster than SVM because the size of the MLP hidden layer may be fixed at 50, while SVM decides its own support vectors during training and there may number in the thousands.

There may be two sets of results, one for MLP and one for SVM. SVM may perform better than MLP in almost all conditions. In the SVM model, a decision length of 0.5 second appears to be the optimal choice. With decision lengths greater than 0.5 second, the accuracy of SVM may decrease because resolution is lost rather than more errors being absorbed.

The previously described experiment may be based on collected data. In other words, the experiment is offline. To implement the system in real time, a simulation may be built in LabView, and MATLAB code may be executed as a remote function call.

In one embodiment, the invention includes a multi-sensor system for specific movement detection. The multi-sensor system may integrate a standard continuous or pulse radar sensor and a low-resolution thermal FIR-array camera. Radar with no angular resolution may work well when the target is approaching the sensor unit in a radial direction, but may work poorly when objects approach in a lateral direction. In contrast, the FIR-array may work poorly when the target is approaching the sensor unit in a radial direction, but may work well when objects approach in a lateral direction. Thus, by combining both types of sensors in a single detection system and fusing the two sensor signals together for the analysis, it is possible to achieve superior specific movement detection performance. The methods described herein may be used to process and perform the classification for the radar-based portion of such a complementary sensor system. The overall classification performance of the system may be improved by combining both sensor signals.

An input buffer may store 0.5 second of the radar signal and may then decide whether there is a specific movement. Decisions may be delayed until a few future frames are read. In one embodiment, there is a 0.25 second delay, which may be acceptable in the current task.

The present invention may provide novel features for a radar signal. Although acoustic features may be used in speech and audio processing, it may not be quite straightforward to extract them from a radar signal. However, by playing the radar signal about ten times faster than real time, and thereby shifting the radar signal's frequency components into the audible range, it may be possible to recognize specific movement by use of human hearing. That is, a speeded up radar signal affected by specific movement may sound different than a speeded up radar signal that is not produced from specific movement. Speech/audio recognition technology may be used to determine whether the human ear is capable of discerning specific movement in the radar signal. Also, a machine may be taught to recognize specific movement by identifying certain features in a radar signal.

Another novel aspect of the invention involves training a classifier. MLP and SVM, which may be directed to the boundary, may be more effective than a Gaussian mixture model (GMM), which attempts to model the distribution within each class. In a Bayesian framework, GMM estimates likelihood while MLP/SVM calculates posteriori. However, the features may not nicely distribute (due to two different sources of features), and thus discriminative models may outperform generative models. Further, SVM may perform better than MLP due to the two classes having a wide region for plausible boundaries, and a boundary from SVM may be better than a boundary from MLP.

Yet another novel aspect of the invention may be the joint decision-making strategy. The effectiveness of this strategy may be evidenced by the improvement in decision accuracy with increasing decision time length. As discussed above, reasons for the improvement may include that a single frame is too short to make robust decisions, and some context is helpful in building confidence. However, a lot of context is not needed, and a decision that is slightly delayed may still be regarded as real time.

One common problem associated with machine learning is in regard to generalizing. That is, if training cannot cover all user cases, then the system may either fail to detect or may falsely issue an alarm. Thus, careful and comprehensive work may be called for to build a large training set. Another advantage of a large training set of data may be that it is beneficial in the learning of a competent model. This may be especially true for SVM.

The present invention may provide a machine learning approach for specific movement detection using a continuous wave or pulse radar sensor. Acoustic and spectral features may be developed and may be largely effective for discriminating between specific movements and other movements. MLP and SVM may be trained and devised to classify these activities. A decision making stage may incorporate classification results from neighboring frames into a robust decision.

Figure 11:
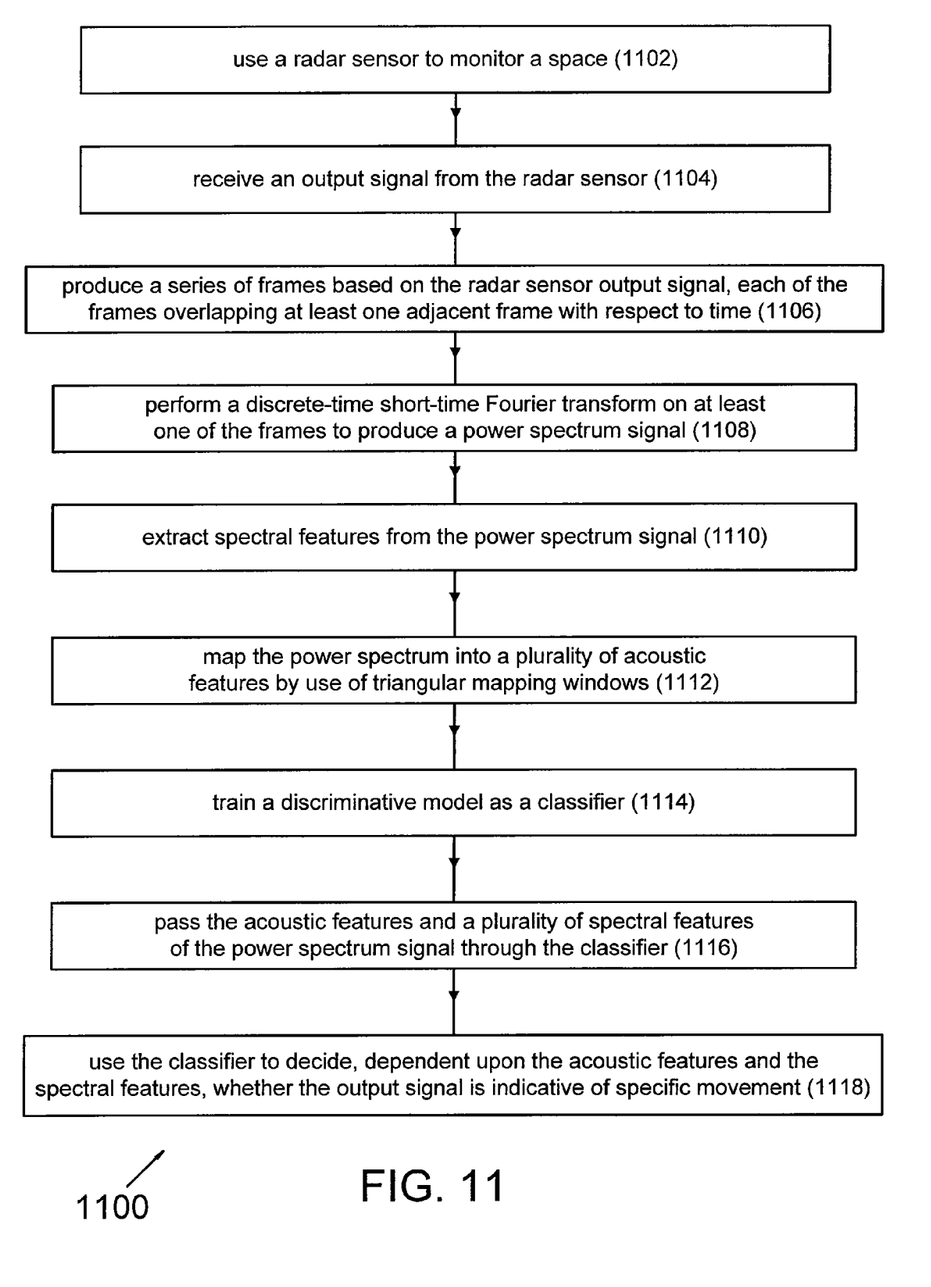
FIG. 11 is a flow chart of one embodiment of a specific movement detection method of the present invention.

One embodiment of a method 1100 of the present invention for detecting specific movement is illustrated in FIG. 11. In a first step 1102, a radar sensor is used to monitor a space. For example, a continuous wave radar sensor or a pulse radar sensor may be used to monitor a space surrounding a motor vehicle.

In a second step 1104, an output signal is received from the radar sensor. That is, the radar sensor may output an electrical signal indicative of what the radar sensor was able to sense within the monitored space. For example, radar sensor device 904 (FIG. 9) may output an electrical signal that is received by analyzer sub-system 902.

Next, in step 1106, a series of frames is produced based on the radar sensor output signal. Each of the frames overlaps at least one adjacent frame with respect to time. For example, the time domain radar sensor output signal of FIG. 3a may be divided into overlapping time windows (i.e., "frames"). In one embodiment, the time length of overlap between two adjacent frames is about one-half the duration of a frame. Thus, each point in time is covered by two overlapping frames.

In step 1108 a discrete-time short-time Fourier transform is performed on at least one of the frames to produce a signal spectrum. For example, the plot of FIG. 3c may be obtained by performing short-time Fourier transforms (STFT) on at least one of the frames of the time domain signal of FIG. 3a.

In a next step 1110, spectral features are extracted from the signal spectrum. For example, spectral features such as spectral flux, spectral flatness, normalized energy, spectral centroid, spectral kurtosis, and spectral bandwidth may be extracted from the signal spectrum of FIG. 3c.

Next, in step 1112, the power spectrum is mapped into a plurality of acoustic features by use of triangular mapping filters. For example, the triangular mapping filters of FIG. 5 may be applied to the signal spectrum of FIG. 3c to thereby determine an amount of energy in each frequency band $m_i$. The amount of energy in each band may represent a respective acoustic feature.

In step 1114, a discriminative model is trained as a classifier. As described hereinabove, a multi-layer perceptron neural network and/or a support vector machine may be trained as a classifier.

In a next step 1116, the acoustic features and a plurality of spectral features of the signal spectrum are passed through the classifier. That is, the acoustic features described with reference to step 1112 and the spectral features described with reference to step 1110 may be fed into the multi-layer perceptron neural network and/or support vector machine that has been trained as a classifier.

In a final step 1118, the classifier is used to decide, dependent upon the acoustic features and the spectral features, whether the output signal is indicative of specific movement. For example, the trained classifier may decide whether there is a specific object or non-human animal present or not based upon the acoustic features and the spectral features that are fed into the classifier.

While this invention has been described as having an exemplary design, the present invention may be further modified within the spirit and scope of this disclosure. This application is therefore intended to cover any variations, uses, or adaptations of the invention using its general principles.

What is claimed is:

1. A method of detecting movements, said method comprising the steps of:
   using a radar sensor to monitor a space;
   receiving an output signal from the radar sensor;
   performing a Fourier transform on the output signal to produce a frequency domain signal spectrum;
   transforming the frequency domain signal spectrum into an acoustic domain signal; and
   deciding whether the output signal is indicative of movement of one of a predetermined object and a predetermined non-human animal, the deciding being dependent upon:
   at least one feature of the acoustic domain signal; and
   at least one spectral feature of the signal spectrum.

2. The method of claim 1 comprising the further step of using the radar sensor output signal to produce a series of frames, each of the frames overlapping at least one adjacent said frame with respect to time, the Fourier transform comprising a short-time Fourier transform that is performed on at least one of the frames.

3. The method of claim 1 comprising the further step of mapping a power spectrum signal onto a Mel scale, the at least one acoustic feature resulting from the mapping.

4. The method of claim 3 wherein the mapping step includes applying a plurality of triangular windows to respective frequency bands.

5. The method of claim 1 comprising the further steps of:
   training a discriminative model as a classifier;
   passing the at least one acoustic feature and the at least one spectral feature of the signal spectrum through the classifier; and
   using the classifier to decide whether the output signal is indicative of movement of a predetermined object or a predetermined non-human animal.

6. The method of claim 5 wherein the discriminative model comprises at least one of a multi-layer perceptron neural network and a support vector machine.

7. The method of claim 1 wherein the acoustic features comprise quantities of energy in respective frequency bands.

8. A method of detecting movements, said method comprising the steps of:
   using a radar sensor to monitor a space;
   receiving an output signal from the radar sensor;
   performing a Fourier transform on the output signal to produce a frequency domain signal spectrum;
   transforming the frequency domain signal spectrum into an acoustic domain signal;
   extracting a plurality of features from the acoustic domain signal;
   passing the features through a classifier; and
   using the classifier to decide whether the output signal is indicative of movement of one of a predetermined object and a predetermined non-human animal, the deciding being dependent upon at least one of the features of the acoustic domain signal.

9. The method of claim 8 comprising the further step of using the radar sensor output signal to produce a series of frames, each of the frames overlapping at least one adjacent said frame with respect to time, the Fourier transform comprising a short-time Fourier transform that is performed on at least one of the frames.

10. The method of claim 8 comprising the further step of mapping the frequency domain spectrum signal onto a Mel scale, at least one said feature resulting from the mapping.

11. The method of claim 10 wherein the mapping step includes applying a plurality of triangular windows to respective frequency bands.

12. The method of claim 8 comprising the further step of training a discriminative model as said classifier.

13. The method of claim 8 wherein the transforming step includes mapping the frequency domain signal spectrum by use of triangular mapping filters.

14. A method of detecting movement, said method comprising the steps of:
   using a radar sensor to monitor a space;

receiving an output signal from the radar sensor;

producing a series of frames based on the radar sensor output signal, each of the frames overlapping at least one adjacent said frame with respect to time;

performing a discrete-time short-time Fourier transform on at least one of the frames to produce a signal spectrum;

mapping the power spectrum of the radar sensor output signal into a plurality of acoustic features by use of triangular mapping windows;

training a discriminative model as a classifier;

passing the acoustic features and a plurality of spectral features of the signal spectrum through the classifier; and using the classifier to decide whether the output signal is indicative of movement of a predetermined object or a predetermined non-human animal.

15. The method of claim 14 comprising the further step of extracting the spectral features from the signal spectrum.

16. The method of claim 14 wherein the classifier decides, dependent upon the acoustic features and the spectral features, whether the output signal is indicative of movement of a predetermined object or a predetermined non-human animal.

17. The method of claim 14 wherein the discriminative model comprises at least one of a multi-layer perceptron neural network and a support vector machine.

18. The method of claim 14 wherein the radar sensor comprises a continuous wave radar sensor.

19. A method of detecting movement, said method comprising the steps of:

using a radar sensor to monitor a space;

receiving an output signal from the radar sensor;

translating the output signal into acoustic levels by modifying a sampling rate of the output signal;

extracting a set of unique features related to motion activities from the output signal in an acoustic domain;

passing the features through the classifier; and using the classifier to decide whether the output signal is indicative of movement of a predetermined object or a predetermined non-human animal.

20. The method of claim 19 wherein the unique features related to motion activities from the output signal in an acoustic domain comprise first features, the method comprising the further step of extracting a set of unique second features related to motion activities from the output signal in a spectral frequency domain.

* * * * *